Sept. 23, 1958  H. L. HOCKEL  2,853,060

COMPRESSION IGNITION ENGINES

Filed Sept. 9, 1955

2,853,060
COMPRESSION IGNITION ENGINES

Hans Ludwig Hockel, Mannheim-Feudenheim, Germany, assignor to Motoren-Werke Mannheim A. G. vorm. Benz Abt. Stat. Motorenbau, Mannheim, Germany, a German company Application September 9, 1955, Serial No. 533,444

Claims priority, application Germany December 22, 1954

4 Claims. (Cl. 123—32)

The invention relates to the particular design of the connection between the pre-combustion chamber and the main combustion space in self-igniting air-compressing injection internal combustion engines. In accordance with the invention the through flow cross-section forming this connection is subdivided by an insert into a central aperture and an outer passage, the injection nozzle spraying through the first-named aperture with a narrow diffusion angle.

It is very important for satisfactory and economical operation of a diesel engine to prevent the meeting of a high-speed stream of air with the stream of fuel since this leads to agglomeration of the droplets of fuel, and thus to insufficient mixing of fuel and air, which in turn leads to high fuel consumption and sooty exhaust. An internal combustion engine fitted with a pre-combustion chamber according to the invention runs very smoothly on all fuels from residual oil (fuel oil) to pure gasoline with very low cetane numbers. There is no appreciable pressure rise at the end of the compression stroke after the ignition of the injected fuel. The ignition lag is also very greatly diminished.

The first object of the invention is not attained by prechamber inserts so far known. Thus, for example, with pre-combustion chamber inserts having a central through flow aperture and several through flow apertures arranged in a circle thereabout, the object of keeping the fuel stream in fairly large drops before splitting up is only very incompletely achieved, because the cross-sections of the outer apertures disposed in a circle is so narrow and the flow path at such a large angle that the majority of the combustion air flows through the central aperture, meets the fuel stream and affects same in the disadvantageous manner described.

On the other hand, the first object of the invention, to avoid these disadvantages, is attained by so designing the insert piece in a pre-combustion chamber arranged symmetrically to the axis of the injection nozzle, said insert piece having a central aperture through which the injected fuel stream is directed, and having an outer passage cross-section arranged annularly about the central aperture, that the cross-sectional ratio of the central aperture to the outer annular cross-section and the total choking effect caused by the insert and finally the injection pressure are so dimensioned that the air flowing in through the central aperture during the compression stroke does not alter the originally intended form and drop size of the fuel stream.

In certain embodiments of the invention it is advantageous to span the outer annular cross-section of the insert piece by several, preferably three, flanges, which extend with an oblique surface in the longitudinal direction of the insert piece and are of arcuate form. This causes the paths of the fuel particles driven into the cylinder space by the ignited fuel in the pre-combustion chamber to twist obliquely downwards, and thus to use up the air in the main combustion space as quickly and completely as possible.

The particular form of the flanges has the additional advantage that cracks due to heat stresses are avoided.

The insert piece according to the invention acts, because of its high temperature, as a preparation path, and experiments have also shown that the prevention of splitting of the fuel stream and the avoidance of too heavy a choking effect together with the excellent twisting effect result in very low fuel consumption.

The second object of the invention is so to design the flow cross-sections of the insert that transfer losses on the compression stroke are made as low as possible in spite of sufficient choking effect to give smooth enough combustion and effective atomisation.

A further object of the invention is the avoidance of eddies on the outer walls of the chamber outside the insert itself, which dissipate power and disturb the closed form of the fuel stream, and thus upset the action of the pre-chamber.

The second object is achieved by shaping the outer cross-sections of the insert which represent the major portion of the cross-section, as a nozzle for flow with as little loss as possible during the compression stroke. The part adjoining the main combustion space is designed as a constantly decreasing inlet cross-section, while the adjoining extension facing the inside of the pre-chamber follows the laws applicable to the design of a diffuser (aperture angle of the substitute cone $<8°$). This gives flow with the smallest loss on the compression stroke.

Pre-chamber inserts having a bore of comparable cross-sectional pattern have already been proposed. These inserts cannot, however, have the advantageous action of the present invention, since the air stream entering the pre-combustion chamber is not prevented from meeting the fuel stream, this only being possible with an insert of which the main flow cross-sections lead the incoming air past the fuel stream. In addition, none of the known publications contains the theory that it is advantageous to use an insert designed in accordance with the laws for shaping nozzles for reducing the choking losses on the compression stroke. Consequently, the known inserts have too great a broadening angle, so that they cannot act in the advantageous manner for which the invention strives.

The third object of the invention mentioned is achieved by causing the outer parts of the insert to merge without change of direction into the walls of the pre-combustion chamber, and the conical broadening of the outer cross-sections of the insert to extend obliquely outwards, so that the air flow led by the outer cross-sections is caused to lie against the walls of the chamber.

Pre-combustion chamber inserts with a single central bore of nozzle-like form are already known in which the outside limit of the insert bore merges gradually into the walls of the chamber, but these forms cannot cause the air flow to lie against the walls of the chamber, since the insert does not impose any outward deflection on the flow, and since the unavoidably large broadening of a central bore to the full cross-section of the pre-combustion chamber must lead to dispersal of the flow at the transition point. The eddies arising represent a loss of power, and scatter the fuel stream in a manner disadvantageous for the preparation of same.

The fourth object of the invention is achieved by giving the outside limit of the central aperture on the pre-combustion chamber side a continuously decreasing inlet cross-section, so that the diffused stream cone which substantially exceeds the smallest diameter of the central aperture in its broadening perpendicularly to the central axis of the pre-combustion chamber is drawn into the central aperture after the onset of ignition.

The gradual narrowing of the inlet on the pre-combustion chamber side to the aperture connecting to the main combusion space known in pre-combustion chamber inserts, with a central bore cannot here provide any suggestions for the invention, since the danger of encrustation with the size of the bore then used and of the lack of a second cross-section into which the outgoing gas stream can escape and the heavy flow caused thereby are not present. The known constructional forms of pre-combustion chamber inserts thus have no clue to the theory upon which the invention is based, that it is possible with an insert consisting of a relatively narrow central bore and a relatively broad further cross-section arranged annularly about the central bore to prevent encrustation of the central bore while arranging continuously narrowing inlet cones at the pre-combustion chamber end of the central aperture.

The outlet form of the outer cross-sections facing the main combustion space assists the distribution of the burning streams of gas in the main combustion space by its arcuate broadening in conjunction with the oblique position of the flanges, although not preventing wall dispersal. Other objects and advantages will be more apparent to those skilled in the art from the following description of the drawing illustrating several embodiments of the invention in which Fig. 1 shows a longitudinal section through a pre-combustion chamber and a part of the cylinder head and of the cylinder and piston depressions, an insert piece according to the invention providing the connection, while Fig. 2 shows a modification.

Figure 1:
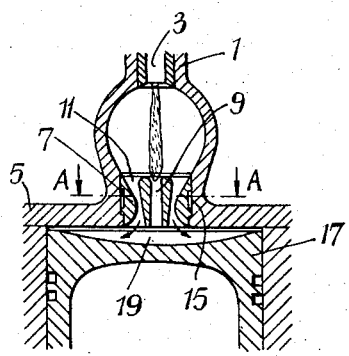
Figure 2:
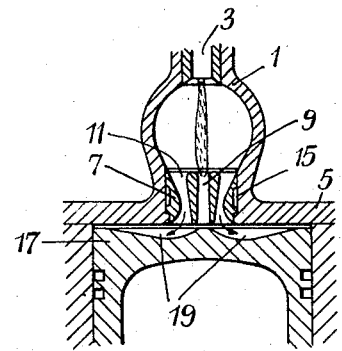
Figure 3:
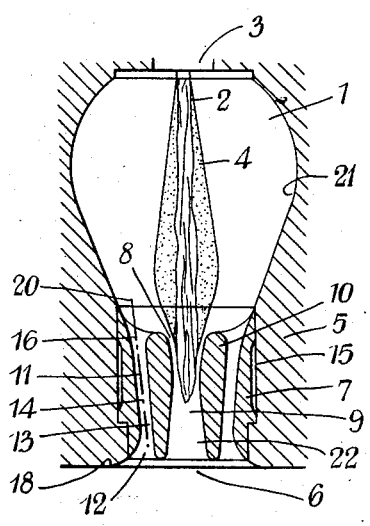
Fig. 3 shows details of the invention in a section of the pre-combustion chamber on an enlarged scale.
Figure 4:
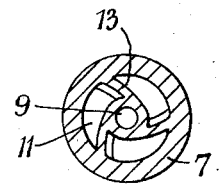
Fig. 4 represents a sectional view of the insert taken on line A—A of Fig. 1.

As shown in Figs. 1, 2 and 3, an injection nozzle 3 is arranged adjacent the pre-combustion chamber, and injects fuel into the chamber in a closed stream (diffusion angle= approx. 0°), the inner portion 2 of the stream being almost cylindrical, and the diffused outer region 4 being conical. An insert piece 7 is arranged in the connection between the pre-combustion chamber 1 and the main combustion space 6, said insert piece being disposed in the cylinder head 5, which is, for example, water-cooled. The outside limit of the pre-combustion chamber 1 is formed by the cylinder head 5. The insert 7 has a central aperture 9 and an outer passage 11 of annular cross-section, which is sub-divided by flanges 13 (see Fig. 4). The flanges 13 are oblique in the longitudinal direction of the insert, and extend arcuately. The pre-combustion chamber end of the central aperture 9 has a narrowing inlet 8 extending over approximately a third of the length of the aperture and having a maximum diameter approximating to the mean diameter of the wall part 10. There follows a conical widened portion 22, which opens out into the main combustion space 6. The outer passage consists of an inlet part 12 which starts with a diameter corresponding at least to the outside diameter of the insert. The outside limit 18 facing the main combustion space is so designed that the streams of gas issuing from the pre-combustion chamber are given a direction in conjunction with the piston crown at an acute angle to the piston crown.

The piston 17 of the internal combustion engine has a depression 19, which is entered by the contents of the pre-combustion chamber in the direction of the arrows in Fig. 1. The piston depression 19 can either be annular in adaptation to the flow path, as shown in Fig. 2, or can have a semi-spherical cross-section, as shown in Fig. 1.

The inlet 12 is followed in the direction towards the interior of the pre-combustion chamber by a portion of constant cross-section 14, which is followed by a diffuser-like broadening 16. The broadening angle of the portion 16 is less than 8°, so that there is no wall dispersal. The centre line 20 of the portion 16 extends obliquely outwards, so that the air streams entering the pre-combustion chamber are deflected away by the diffused stream 4 to the pre-combustion chamber wall 21, where they are free of eddies. The insert 7 consists of a highly heat-resisting material, and is inserted in the cylinder head head 5 with an air gap 15 to restrict heat transfer, so that during operation its temperature rises enough for preparation of the fuel. The pre-combustion chamber 1 and the passages of the insert piece contain at the end of the compression stroke between 30% and 70% of the total combustion air. The smallest cross section of the central bore 9 is in a relation between 1:1 and 1:10 to the smallest cross-section of the outer passage 11. The relation between the volumes of the pre-combustion chamber and the passages 9 and 11 of the insert piece to the smallest total cross-section of the passages 9 and 11 can be fixed in the following manner.

The volume of the pre-combustion chamber plus the volume of the passages 9 and 11 measured in cubic inches divided by the smallest total cross-section of the passages 9 and 11 measured in square inches gives a value which lies between 8 and 40 inches.

This value characterises the total choking effect caused by the insert.

The device described operates as follows:

Towards the end of the compression stroke fuel is injected through an injection nozzle 3 in a stream of the form described towards the inlet 8 of the central aperture 9, while the air forced out of the main combustion space 6 enters the pre-combustion chamber 1 substantially through the outer passage 11, and only enters slightly into contact with the outer surface of the diffused stream cone 4. The total cross-section is so dimensioned in relation to the central aperture 9 that the latter does not appreciably split the flow of the fuel stream on the compression stroke. Transfer losses are very small because of the way in which the outer passage 11 is shaped, since all alterations of cross-section proceed continuously having regard to the reduction in cross-section by the vanes 13 and since the inlet 12 is furthermore so designed that the transformation from pressure to speed takes place without losses. The fact that ingress into the pre-combustion chamber 1 takes place in a diffuser-like cross-section 16 ensures that pressure is regained as completely as possible from kinetic energy. The cross-section 16 is carried over without change of direction into the pre-combustion chamber walls 21, and has such a direction that eddy-free air flow against the wall 21 is ensured.

Ignition takes place in the vicinity of top dead centre in the region of the diffused stream 4, and the increase of pressure which arises in the pre-combustion chamber drives the still unburnt fuel through the flow paths 9 and 11 into the main combustion space 6, so atomising the unburnt fuel and preparing same by contact with the hot insert 7 that complete combustion can take place in the main combustion space 6.

The broadened inlet 8 to the central bore 9 ensures in this connection that the diffused stream 4 is drawn into the central aperture as shown in the drawing. A strong flow simultaneously arises in the central aperture 9, and is favoured by the nozzle-shaped broadened portion 22. The distribution of the streams of gas flowing from the outer passage 11 into the main combustion space is assisted by the oblique arcuate shape of the flanges 13, which impart additional twist to the said streams.

Figure 5:
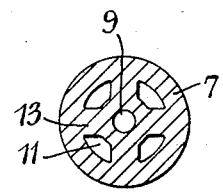
Fig. 5 represents a modified sectional view taken on line A—A of Fig. 1.

The design of the flow paths, with a view to the lowest possible losses in flow into the pre-chamber through the outer passage 11 and a like flow through the flow paths 9 and 11, followed by smooth deflection in the piston depression 19, can also be used with advantage with inserts having vanes extending parallel to the central axis of the pre-combustion chamber as shown in Fig. 5.

I claim:

1. An internal combustion engine of the liquid fuel injection, compression ignition type, comprising a cylinder having a working chamber, a piston slidable in the cylinder and having a crown with a depression therein, a cylinder head defining an open-mouth pre-combustion chamber, an insert piece positioned in the mouth of the pre-combustion chamber and facing said depression, said insert piece defining an air gap with the cylinder head, said insert having a wall defining a central aperture and further walls including inner and outer walls defining an outer passage surrounding and co-axial with said central aperture, a fuel injection nozzle adjacent said chamber and disposed symmetrically in relation to the axis of the pre-combustion chamber, a fuel stream injected into said chamber towards the end of the compression stroke of the piston being directed towards the central aperture and coming, at its greatest diameter, substantially into contact with the wall of the central aperture, the wall of the central aperture having a rounded edge at the pre-combustion chamber end, the outer wall of the outer passage having the substantial form of an hyperboloid of rotation, the dimensions of the pre-combustion chamber, the central aperture, the outer passage and the depression being such that, at the end of the compression stroke of the piston, between 30% and 70% of the combustion air is in the pre-combustion chamber, central aperture and outer passage, the smallest cross-section of the central aperture being in a relation between 1:1 and 1:10 to the smallest cross-section of the outer passage, the sum of the volumes of the pre-combustion chamber, the central aperture and the outer passage, measured in cubic inches, divided by the minimum cross-sectional area of the outer passage, measured in square inches, giving a value of between 8 and 40 inches.

2. An internal combustion engine according to claim 1, comprising three vanes of arcuate form in the annular outer passage of the insert piece, said vanes extending with an oblique surface in the longitudinal direction of the insert piece.

3. An internal combustion engine according to claim 1, the outer passage including: a narrowing inlet opening into the main combustion space and starting approximately at the periphery of the insert piece, the outer wall of said inlet approaching the piston crown at an acute angle, a middle section of constant cross section and a diffuser-like outlet, the outlet being of substantially conical shape, the base angle of which is less than 8°, the outlet wall merging without change of direction into the pre-combustion chamber wall, the inlet, middle piece and outlet being arranged seriatim in the flow path of the combustion air, the central aperture having an inlet at the pre-combustion chamber end which narrows, from a diameter approximating the mean diameter of the wall part of the central aperture, continuously to the narrowest diameter of the central aperture, said inlet extending over the first third of the total length of the aperture, the other part of the central aperture facing the main combustion space being a conical broadened portion.

4. An internal combustion engine of the liquid fuel injection, compression ignition type, comprising a cylinder having a working chamber, a piston slidable in the cylinder and having a crown with a depression therein, a cylinder head defining an open-mouth pre-combustion chamber, an insert piece positioned in the mouth of the chamber and facing said depression, said insert piece defining an air gap with the cylinder head, said insert having a wall defining a central aperture and further walls including inner and outer walls defining an outer passage surrounding and co-axial with said central aperture, a fuel injection nozzle adjacent said chamber and disposed symmetrically in relation to the axis of the pre-combustion chamber, a fuel stream injected into said chamber towards the end of the compression stroke of the piston being directed towards the central aperture and coming, at its greatest diameter, substantially into contact with the wall of the central aperture, the wall of the central aperture having a rounded edge at the pre-combustion chamber end, the dimensions of the pre-combustion chamber, the central aperture, the outer passage and the depression being such that, at the end of the compression stroke of the piston, between 30% and 70% of the combustion air is in the pre-combustion chamber, central aperture and outer passage, the smallest cross-section of the central aperture being in a relation between 1:1 and 1:10 to the smallest cross-section of the outer passage, the sum of the volumes of the pre-combustion chamber, the central aperture and the outer passage, measured in cubic inches, divided by the minimum cross-sectional area of the outer passage, measured in square inches, giving a value of between 8 and 40 inches.

References Cited in the file of this patent

UNITED STATES PATENTS

| 2,201,221 | Bokemuller | May 21, 1940 |
| 2,242,274 | Thysse | May 20, 1941 |

FOREIGN PATENTS

| 685,718 | Germany | Dec. 23, 1939 |